(12) United States Patent
O'Boyle

(10) Patent No.: US 6,363,793 B2
(45) Date of Patent: *Apr. 2, 2002

(54) COMPRESSIVE VILLARI EFFECT SEATBELT TENSION SENSOR

(75) Inventor: Michael E. O'Boyle, Brighton, MI (US)

(73) Assignee: Automotive Systems Laboratory, Inc., Farmington Hills, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/224,248

(22) Filed: Dec. 30, 1998

Related U.S. Application Data

(60) Provisional application No. 60/070,319, filed on Jan. 2, 1998.

(51) Int. Cl.[7] .................................................. G01N 3/08
(52) U.S. Cl. ........................................................ 73/828
(58) Field of Search ................................ 73/828, 865.9, 73/862.44, 862.391; 297/217.7

(56) References Cited

U.S. PATENT DOCUMENTS

| | | | |
|---|---|---|---|
| 2,867,118 A | 1/1959 | Cavanagh ................. 73/862.69 |
| 3,618,378 A | 11/1971 | Shull et al. .............. 73/862.474 |
| 3,675,482 A | 7/1972 | Hewitt ......................... 73/144 |
| 3,720,100 A | 3/1973 | Grunbaum .................... 73/144 |
| 4,597,297 A | 7/1986 | Smith ...................... 73/862.48 |
| 4,802,368 A | 2/1989 | Nordvall ................... 73/862.69 |
| 4,823,621 A | 4/1989 | Sobel ........................ 73/862.69 |
| 5,007,295 A | 4/1991 | Gustafsson et al. ...... 73/862.69 |
| 5,181,739 A | * 1/1993 | Bauer et al. ............ 73/862.391 |
| 5,329,822 A | 7/1994 | Hartel et al. .............. 73/862.61 |
| 5,437,197 A | 8/1995 | Uras et al. ................ 73/862.69 |
| 5,580,084 A | 12/1996 | Gioutsos ..................... 280/735 |
| 5,647,633 A | * 7/1997 | Fukoka ................. 297/862.331 |
| 5,739,757 A | * 4/1998 | Gioutsos ..................... 340/667 |
| 5,747,696 A | 5/1998 | Kwun et al. .................. 73/728 |
| 5,767,766 A | * 6/1998 | Kwun ......................... 340/436 |
| 5,905,210 A | * 5/1999 | O'Boyle et al. ........ 73/862.331 |
| 5,960,523 A | 10/1999 | Husby et al. .................. 24/633 |
| 5,965,827 A | * 10/1999 | Stanley et al. ......... 73/862.391 |
| RE36,427 E | 12/1999 | Gioutsos ..................... 280/735 |
| 5,996,421 A | 12/1999 | Husby .................... 73/862.451 |
| 6,081,759 A | 6/2000 | Husby et al. .................. 701/45 |
| 6,205,868 B1 | * 3/2001 | Miller ................... 73/862.391 |
| 6,209,915 B1 | 4/2001 | Blakesley ................ 280/801.1 |
| 6,230,088 B1 | 5/2001 | Husby ......................... 701/45 |

FOREIGN PATENT DOCUMENTS

DE 40 39 121 A1 6/1991 ........... B65H/63/04

OTHER PUBLICATIONS

Kwun, H., "Magnetostrictive Sensors Technology", reprinted from Technology Today, Mar., 1995, pp. 3–7.
Uras, M., "Signal Detection Methods for Magnetostrictive Sensors", 970604, reprinted from *Sensors an Actuators* 1997, SP–1220, Society of Automotive Engineers, Feb. 24, 1997, pp. 23–33.

* cited by examiner

Primary Examiner—Benjamin R. Fuller
Assistant Examiner—Octavia Davis
(74) Attorney, Agent, or Firm—Dinnin & Dunn P.C.

(57) ABSTRACT

A Villari effect seatbelt tension sensor 10 comprises a sensor housing 30 having a sensor chamber 32 therein. A first end 34 of the sensor housing 30 has a plurality of pull rod holes 36 therein for acceptance of a plurality of pull rods 60. A Villari effect sensor 20 comprising a magnetostrictive sensor rod 22 is disposed axially within the sensor chamber 32 and abuts the first end 34 of the sensor housing 30. A plunger 40 is disposed within the sensor chamber 32 and is slidably movable therein. One end of the pull rods 60 is secured to the plunger 40. A spring 50 is disposed between the plunger 40 and a second end 26 of the sensor rod 22 to bias the sensor rod 22 toward the first end 34 of the sensor housing 30.

14 Claims, 1 Drawing Sheet

COMPRESSIVE VILLARI EFFECT SEATBELT TENSION SENSOR

CROSS-REFERENCE TO RELATED APPLICATIONS

The instant application claims the benefit of U.S. Provisional Application Serial No. 60/070,319 filed Jan. 2, 1998, commonly assigned with the present invention.

This application is related to copending U.S. application Ser. No. 09/196,093, filed Nov. 19, 1998, entitled "Villari Effect Seatbelt Tension Sensor", claiming the benefit of U.S. Provisional Application Serial No. 60/067,071, filed Nov. 20, 1997, both commonly assigned with the present invention.

BACKGROUND OF THE INVENTION

The instant invention relates to a seatbelt tension sensor system that employs a Villari effect sensor to measure tension in an automotive passenger restraint belt (seatbelt) application. Specifically, this invention provides a seatbelt tension sensor system which is rugged, insensitive to changes in temperature, and provides analog tension measurement at a high sampling rate.

The measurement of seatbelt tension is desirable in a wide variety of situations. Seatbelt tension measurements may be used to trigger seatbelt pretensioners, to modify airbag inflation profiles based upon the severity of a collision, and to measure any forward acceleration of a seat occupant, thereby allowing other collision related forces to be calculated. Additionally, seatbelt tension measurements may be used in conjunction with a seat weight sensor to ascertain the presence of an infant seat in an automobile.

A vehicle may contain automatic safety restraint actuators that are activated responsive to a vehicle crash for purposes of mitigating occupant injury. Examples of such restraint actuators include air bags, seatbelt pretensioners, and deployable knee bolsters.

One objective of an automatic safety restraint system is to mitigate occupant injury, thereby not causing more injury with the automatic restraint system than would be caused by the crash had the automatic restraint system not been activated. Notwithstanding the protective benefit of these automatic safety restraint actuators, there is generally both a risk and a cost associated with the deployment thereof. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

Therefore, it is desirable to determine the presence of an infant seat in an automobile to inhibit the actuation of the airbag inflator. It has been demonstrated that when securing an infant seat to an automobile seat, seatbelt tension is often considerably higher than when adult or "normal sized" occupants are wearing the seatbelt. Individuals wearing seatbelts will rarely tighten a seatbelt above 10 pounds of seatbelt tension under normal operating conditions. In contradistinction, tests have shown that seatbelt tensions used to secure infant seats are as high as 50 pounds. In systems so equipped, high seatbelt tension can induce artificially high readings in a seat weight sensor by forcing the infant seat down into a seat pad used to sense the weight of an occupant on the seat. Therefore, when abnormally high seatbelt tension exists in combination with a high seat weight reading the presence of an infant seat may be deduced and the inflation profile of an airbag modified accordingly.

Known seatbelt tension measurement systems generally include spring-loaded contact sensors and load cells. Spring-loaded contact sensors provide only threshold weight detection, that is whether tension on the belt is above or below a certain threshold determined by the spring. Load cells provide moderately reliable analog tension measurement but are expensive, require periodic calibration, are easily damaged by off-axis loads, and have output readings that vary significantly with changes in temperature. Additionally, many load cell analog outputs signals are the product of an electronic summing junction that may induce time delays in obtaining a tension measurement thereby rendering the measurement unsuitable for a time-critical operation such as inhibiting the deployment of a passenger restraint.

SUMMARY OF INVENTION

In accordance with the present invention a seatbelt tension measurement system employing a Villari effect sensor is provided. This system provides a mechanism to transfer tensile force acting on the seatbelt to the Villari effect sensor thereby generating an electrical signal responsive to the amount of tension present in a seatbelt. A sensor housing is provided which encloses the Villari effect sensor and allows axial movement of a plunger acting thereon. The seatbelt tension sensor translates all of the tensile force acting on the seatbelt into compressive force acting on the Villari effect sensor while minimizing the effects of friction thereon.

The present invention provides a tension measurement system which is relatively uncomplicated in design, insensitive to variations in temperature, does not require periodic calibration, is not affected by off-axis loads, and can provide tension values at extremely high sampling rates. The instant invention also has the added advantage of being inexpensive to produce in comparison with, for example, load cell technology. Another feature of the instant invention is the ability to locate the sensor in several locations in the seatbelt system, depending on vehicle design requirements.

In addition, an electrical output provided by the present invention can be used to determine rates of deceleration in the event of a collision and can be used in concert with a seat weight sensor to determine the presence of an infant seat.

Accordingly, one object of the instant invention is to provide a seatbelt tension sensor that is capable of being incorporated into an airbag control system for determining the presence of an infant seat or other non-adult item in a vehicle seat.

Another object of the instant invention is to provide a seatbelt tension sensor that is rugged and insensitive to changes in temperature.

Yet another object of the instant invention is to provide a seatbelt tension sensor that is inexpensive to produce.

A yet further object of the instant invention is to provide a seatbelt tension sensor that may be placed in several positions within a vehicle seatbelt system depending on design requirements.

A yet further object of the instant invention is to provide a seatbelt tension sensor employing a Villari effect sensor to provide an analog tension indication to a passenger restraint control system.

The instant invention will be more fully understood after reading the following detailed description of the preferred embodiment with reference to the accompanying drawing figures.

DETAILED DESCRIPTION OF THE PREFERRED EMBODIMENT

Figure 1:
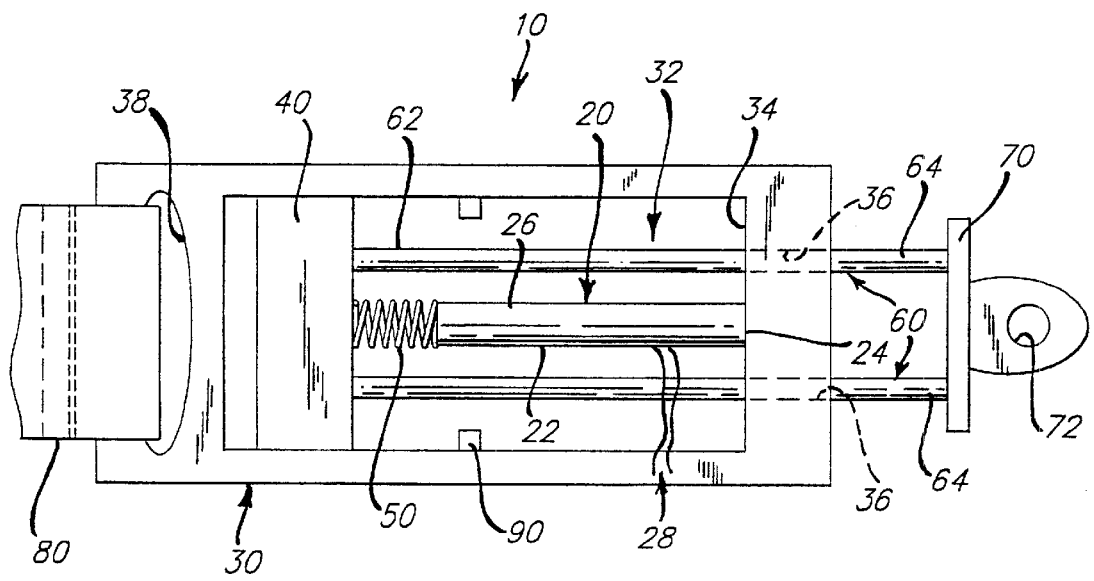
FIG. 1 is a diagrammatic illustration of a Villari effect seatbelt tension sensor in accordance with the instant invention.

The seat weight sensor of the present invention operates by utilizing the principal that the magnetic permeability of certain materials varies under the application of mechanical stress applied to the material. This principal is known as the Villari effect.

More specifically, the Villari or "inverse Joule magnetoelastic" effect was discovered and studied by Joule and Villari in the mid 1800's. The Villari effect phenomenon occurs in ferromagnetic materials and is characterized by a change in the magnetic permeability of the material when subjected to stress. That is, the ability to magnetize the material depends upon the level of stress applied to the material. The Villari effect is closely related to the magnetostriction phenomenon. Magnetostriction (often called "Joule magnetostriction") characterizes the expansion or contraction of a ferromagnetic material under magnetization. Positive magnetostrictive materials expand parallel to the direction of the magnetic field when magnetized, whereas negative magnetostrictive materials contract in the direction parallel to the magnetic field when magnetized.

Materials which exhibit magnetostrictive properties will also exhibit the Villari effect. Materials with a positive magnetostriction coefficient suffer a decrease in magnetic permeability when subjected to compressive stresses, and will exhibit an increase in permeability when subjected to tensile stresses. The reverse occurs in negative magnetostrictive materials, i.e., permeability increases when compressive stresses are applied and decreases upon the application of tensile stress. This change in permeability or response magnetization of the material when stress is applied thereto is referred to as the Villari effect.

Examples of positive magnetostrictive materials include iron, vanadium permendur (49% iron, 49% cobalt, 2% vanadium), or the permalloy (Nickel-iron) series of alloys. Terfenol-D is a ceramic material consisting of iron, terbium, and dysprosium specifically formulated to have an extremely high positive magnetostriction. Nickel is an example of a material with a negative magnetostriction coefficient. If a metallic alloy is used, the material must be properly annealed in order to remove work hardening effects and to ensure reasonable uniformity of the sensing material.

The Villari effect sensor utilized in the present invention consists of positive magnetostrictive material permeated by a magnetic field of known strength. Sense coils disposed around the material are used to measure field strength through the material. When the material is subjected to a compressive force, the field strength within the material changes thereby enabling the calculation of force applied to the material by monitoring the change in an applied voltage or current through the sense coils.

The seatbelt tension sensor of the instant invention is arranged to measure compressive forces, and as described more fully hereinbelow, is applicable to a tension measuring Villari effect sensor. Initially, an appropriate magnetostrictive material must be selected to measure compressive forces acting on the seatbelt. When measuring compressive forces it is preferred that the material have a positive magnetostrictive coefficient so as to exhibit a decrease in permeability in the presence of a compressive force. The sign of the magnetostriction coefficient is chosen so that the sensor operates in a region of decreasing magnetic permeability. Generally, a sensor which utilizes a decreasing permeability with increased force will have a much greater dynamic range and will provide a signal which varies more linearly with applied force than one which utilizes increasing permeability as force is applied.

Known in the art Villari effect sensors are constructed from a sensing rod comprised of magnetostrictive material enclosed by a drive coil having an alternating drive current applied thereto that creates an alternating magnetic field through the material. A plurality of sense coils are also wrapped around the material to provide voltage or current output signals proportional to the derivative of the magnetic flux within the magnetostrictive material. The output signals are operatively coupled to a control processor that is suitably programmed to perform various functions associated with the control of a passenger restraint system, for example, inhibiting the deployment of an airbag.

Referring to FIG. 1, a Villari effect seatbelt tension sensor 10 in accordance with a preferred embodiment of the present invention comprises a Villari effect sensor 20 having a magnetostrictive sensor rod 22 disposed axially within a sensor chamber 32 defined by a sensor housing 30. The sensor housing 30 has a first end 34 having a plurality of pull rod holes 36 therein, as further explained hereinbelow. A first end 24 of the sensor rod 22 abuts the first end 34 of the sensor housing 30.

A plunger 40 is disposed within the sensor chamber 32 and is slidably movable therein in an axial direction. A spring 50 is disposed between the plunger 40 and a second end 26 of the sensor rod 22 to bias the sensor rod 22 towards the first end 34 of the sensor housing 30.

A plurality of pull rods 60 extend through the sensor housing holes 36 into the sensor chamber 32 and are secured at a first end 62 to the plunger 40. The pull rod holes 36 are shaped to allow the pull rods 60 to travel freely therethrough. A second end 64 of each pull rod 60 extends to the exterior of the sensor housing 30 and is secured to a pull rod head 70 by conventional means such as screws, welds or other suitable fasteners. The pull rod head 70 has a mounting bolt hole 72 therein for securing the sensor 10 to the frame of a vehicle.

The pull rods 60 and the plunger 40 secured thereto are free to move axially within the sensor housing chamber 32 as the pull rods 60 extend through the sensor housing holes 36. The sensor housing 30 is further provided with a seatbelt orifice 38 therein opposite the first end 34 for securing a seatbelt 80 thereto.

In operation, as seatbelt 80 tension increases the sensor housing 30 is pulled opposite the pull rod head 70, thereby forcing the plunger 40 to move axially within the sensor housing 30 and compressing the spring 50 against the Villari effect sensor 20. All of the tensile force acting on the seatbelt 80 is transferred to the Villari effect sensor rod 22, thereby changing the magnetic permeability thereof. The axial movement of the plunger 40 and pull rods 60 within the sensor housing 30 ensures that all seatbelt tension is applied as compressive force to the Villari effect sensor rod 22, not dissipated by frictional forces. As the magnetic permeability through the sensor rod 22 changes, the Villari effect sensor 20 generates an output 28 responsive to the amount of compressive force acting thereon to a control processor for use in controlling a passenger restraint actuation system.

In an alternative embodiment of the instant invention, the sensor housing chamber 32 has an inwardly extending radial flange 90 disposed therein at a point wherein the plunger 40 abuts the flange 90 in the event of sensor rod breakage. This feature of the instant invention prevents the seatbelt 80 from traveling any significant distance in the event of sensor breakage, thereby enhancing passenger safety.

Figure 2:
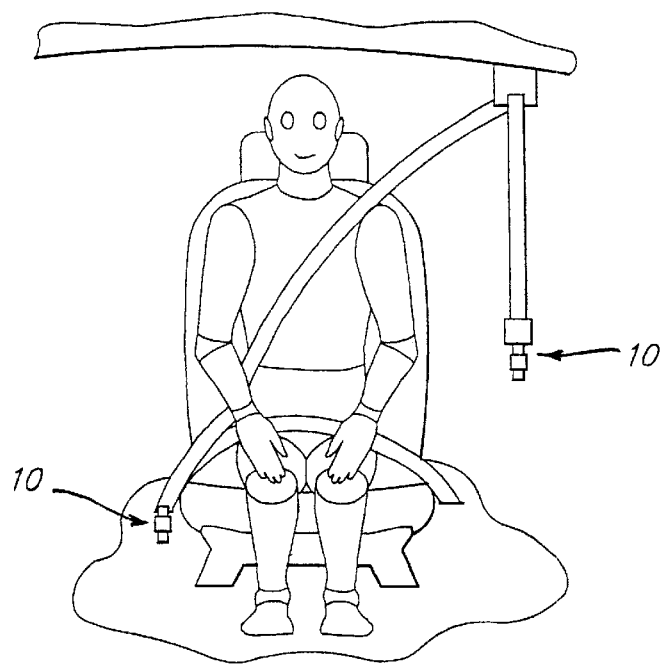
FIG. 2 is an illustration of possible placement of the seatbelt tension sensor of the instant invention in an automobile seatbelt system.

As shown in FIG. 2, the Villari effect seatbelt tension sensor 10 may be positioned in a plurality of positions in a conventional seatbelt system depending upon design requirements, and may be retrofitted to existing passenger restraint systems.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A seatbelt tension sensor comprising:
   a sensor housing having a sensor chamber therein, a first end having a plurality of pull rod holes therein, and a seatbelt orifice opposite the first end for acceptance of said seatbelt;
   an axially movable plunger disposed within the sensor chamber;
   a plurality of pull rods extending through the pull rod holes of said sensor housing secured at a first end to said plunger and secured at a second end to a pull rod head having a mounting hole therein;
   a Villari effect sensor disposed axially within the sensor chamber having a first end abutting the first end of said sensor housing, and;
   a spring disposed between said Villari effect sensor and said plunger for biasing said Villari effect sensor towards said sensor housing first end.

2. The seatbelt tension sensor as claimed in claim 1 wherein said sensor housing further comprises an inwardly extending radial flange disposed therein to prevent said plunger from traveling past said flange in an event of breakage of said Villari effect sensor.

3. The seatbelt tension sensor as claimed in claim 1 wherein said Villari effect sensor generates an output responsive to a compressive force acting thereon.

4. The seatbelt tension sensor as claimed in claim 1 wherein said Villari effect sensor comprises a magnetostrictive rod having a positive magnetostrictive coefficient.

5. The seatbelt tension sensor as claimed in claim 2 wherein said Villari effect sensor generates an output responsive to a compressive force acting thereon.

6. The seatbelt tension sensor as claimed in claim 2 wherein said Villari effect sensor comprises a magnetostrictive material having a positive magnetostrictive coefficient.

7. A seatbelt tension sensor comprising:
   a housing having a chamber therein;
   a plunger moveable within said chamber; and
   a Villari effect sensor disposed within said chamber, wherein a first end of said Villari effect sensor operatively engages said plunger, a second end of said Villari effect sensor operatively engages an end of said chamber, and said Villari effect sensor is responsive to a tension in the seat belt when the seatbelt is operatively coupled to at least one of said housing and said plunger, and said tension is applied to the seatbelt.

8. A seatbelt tension sensor as claimed in claim 7, further comprising a seatbelt orifice operatively coupled to said housing.

9. A seatbelt tension sensor as claimed in claim 7, further comprising an attachment operatively coupled to said at least one rod.

10. A seatbelt tension sensor as claimed in claim 7, further comprising a spring operatively engaged between an end of said Villari effect sensor and one of said plunger and an end of said chamber.

11. A seatbelt tension sensor as claimed in claim 7, further comprising at least one flange within said chamber, wherein said at least one flange is adapted to limit a motion of said plunger within said chamber.

12. A seatbelt tension sensor as claimed in claim 7, wherein said Villari effect sensor generates an output responsive to a compressive force acting thereon.

13. A seatbelt tension sensor as claimed in claim 7, wherein said Villari effect sensor comprises a magnetostrictive material having a positive magnetostrictive coefficient.

14. A seatbelt tension sensor as claimed in claim 7, further comprising at least one rod operatively connected to said plunger, wherein said at least one rod is slideably engaged with said housing.

* * * * *